United States Patent [19]

Nakamura

[11] Patent Number: 5,736,027
[45] Date of Patent: Apr. 7, 1998

[54] METHOD FOR PRODUCING ELECTROLYTIC WATER

[76] Inventor: Tadamasa Nakamura, 5-2-401, Toyogaoka 3-chome, Tami, Tokyo, Japan

[21] Appl. No.: 788,197

[22] Filed: Jan. 24, 1997

[30] Foreign Application Priority Data

Jan. 30, 1996 [JP] Japan ..................... 8-014535

[51] Int. Cl.⁶ .................................. C02F 1/461
[52] U.S. Cl. ..................... 205/742; 205/746; 210/748
[58] Field of Search ........................ 205/742, 746; 210/748

[56] References Cited

U.S. PATENT DOCUMENTS 4,361,471  11/1982  Kosarek ........................... 205/755
5,620,587  4/1997  Nakamura ........................ 205/742

Primary Examiner—Arun S. Phasge
Attorney, Agent, or Firm—Lorusso & Loud

[57] ABSTRACT

The invention provides a method for producing electrolytic alkaline water and electrolytic acid water of enhanced effectiveness. According to the method of the invention, vitamin C is added to the cathodic electrolytic water produced by primary electrolysis, in a weight percentage of 0.005%–0.05%, and the primary cathodic electrolytic water with the vitamin C added is electrolyzed a second time. Thereby, a secondary cathodic electrolytic water is obtained in which the dissolved oxygen concentration and the oxidation reduction potential are remarkably lowered. Vitamin C is added to the anodic electrolytic water produced by the primary electrolysis in a weight percentage of more than 0.005%, and the primary anodic electrolytic water with the vitamin C added is secondarily electrolyzed. A secondary anodic electrolytic water is thereby obtained which contains a high dissolved oxygen concentration and a low oxidation reduction potential.

3 Claims, No Drawings

METHOD FOR PRODUCING ELECTROLYTIC WATER

BACKGROUND OF THE INVENTION

1. Field of the Invention

The present invention relates to a method for further enhancing the effect of the electrolytic alkaline water and electrolytic acid water produced by electrolyzing water.

2. Description of the Related Art

It has widely been known that electrolyzing water produces an electrolytic alkaline water (cathodic electrolytic water) and an electrolytic acid water (anodic electrolytic water). The electrolytic water producer for producing an electrolytic water has an electrolyzer divided therein by a separating membrane into two areas, in one of which an anode is disposed and in the other of which a cathode is disposed. Applying a current across both of the electrodes produces the electrolytic alkaline water from the cathode area and the electrolytic acid water from the anode area.

The electrolytic alkaline water thus produced has effectiveness for depressing an abnormal intestinal fermentation and the like and it has been used for drinking. The electrolytic acid water, on the other hand, is recognized to have a bactericidal action, an astringent action and the like and it has been used for cleaning and medical treatment. Thus, both of the waters have widely been used for their contribution to health.

As the evaluation scale for the electrolytic water, the pH value representing a hydrogen ion concentration and the residual chlorine concentration have been used in general. However, as use of the electrolytic water producer has become widespread, although there are not any significant differences in the pH value and the residual chlorine concentration of the electrolytic water, two cases wherein the electrolytic water displays a very high effectiveness on one side and on the other side the water scarcely shows effectiveness have become apparent.

In case of the electrolytic alkaline water, when the oxidation reduction potential and dissolved oxygen concentration are comparably low, the water shows a better effect for improving health in most cases. When the oxidation reduction potential and the dissolved oxygen concentration are comparably high, the water shows only a slight effect for improving health in most cases. To be more specific, it has become apparent that when the oxidation reduction potential is as low as −50υ–250 mv and the dissolved oxygen concentration is as low as 4.8–6.8 mg/l, the water displays a high effectiveness for improving health. On the other hand, when the oxidation reduction potential is as high as +100–+250 mv and the dissolved oxygen concentration is as high as 7– 8.2 mg/l, the water shows a poor effectiveness for improving health.

In case of the electrolytic acidic water, when the oxidation reduction potential and the dissolved oxygen concentration are relatively high, the water shows a high astringent and bactericidal action in most cases. When the oxidation reduction potential and dissolved oxygen concentration are relatively low, the water shows a low astringent and bactericidal action in most cases. Specifically, when the pH is less than 4, the oxidation reduction potential is more than +800 mv, and the dissolved oxygen concentration is more than 10 mg/l, the water exhibits a clear astringent effect on the skin, which makes the skin smooth even after the water dries, and the effect lasts long. On the other hand, when the pH is less than 3.5, the oxidation reduction potential is more than +900 mv, and the dissolved oxygen concentration is more than 12 mg/l, the water displays so strong a bactericidal activity as to kill most bacteria in a short time and yet it does not damage skin or mucosa, thus serving as an effective and useful antibacterial agent.

The quality of raw water such as service water changes depending on the season, water temperature, region, and the like and its quality significantly influences the oxidation reduction potential and dissolved oxygen concentration of an electrolytic water produced by an electrolytic water producer. Therefore, the electrolytic alkaline water and electrolytic acid water produced by a conventional electrolytic water producer have varying oxidation reduction potential and dissolved oxygen concentration, so that the desired effect can not be assured.

SUMMARY OF THE INVENTION

The present invention has been made in view of the foregoing problems, and an object of the present invention is to provide a method for producing an electrolytic water that can display an improved effect as an electrolytic alkaline water and/or electrolytic acid water.

In order to accomplish the foregoing object, in the method for producing an electrolytic water according to the present invention, a water is electrolyzed to form an anodic electrolytic water and a cathodic electrolytic water, vitamin C is added in the cathodic electrolytic water in a weight percentage of 0.005 0.05% and the water with the vitamin C added is again electrolyzed.

In another embodiment a water is electrolyzed to form an anodic electrolytic water and a cathodic electrolytic water, vitamin C is added in the anodic electrolytic water in a weight percentage of more than 0.005% and the water with the vitamin C added is again electrolyzed.

DESCRIPTION OF THE PREFERRED EMBODIMENT

Preferred embodiments of the present invention will now be described.

Electrolyzing raw water in an electrolytic water producer will produce a cathodic electrolytic water (hereafter, referred to as "primary cathodic electrolytic water") from the cathode area and an anodic electrolytic water (hereafter, referred to as "primary anodic electrolytic water") from the anode area. The method for producing the primary cathodic electrolytic water and primary anodic electrolytic water and the electrolytic water producer are well known, and the description thereof will be omitted.

Vitamin C (ascorbic acid 100%) is added to the primary cathodic electrolytic water produced by the electrolysis in a weight percentage of 0.005–0.05% of the primary cathodic electrolytic water, which is again electrolyzed in a conventional type electrolytic water producer.

Here, the components of the waters employed or produced in the course of the test will be shown in the following table; in which:

(A-1) is service water used as the raw water, (A-2) is a primary cathodic electrolytic water produced by electrolyzing the service water, (A-3) is a secondary cathodic electrolytic water produced by electrolyzing the primary cathodic electrolytic water without anything added, (A-4) is the primary cathodic electrolytic water with 0.005% wt vitamin C added, (A-5) is a secondary cathodic electrolytic water produced by electrolyzing the primary cathodic electrolytic water with the 0.005% wt vitamin C, (A-6) is the primary cathodic electrolytic water with 0.001% wt vitamin C added, (A-7) is a secondary cathodic electrolytic water produced by electrolyzing the primary cathodic electrolytic water with the vitamin C added in the amount of 0.001% wt, (A-8) is the primary cathodic electrolytic water with vitamin C added in the amount of 0.025% wt, (A-9) is a secondary cathodic electrolytic water produced by electrolyzing the primary cathodic electrolytic water with the vitamin C added in the amount of 0.025% wt;

(A-10) is the primary cathodic electrolytic water with vitamin C added in the amount of 0.05% wt, and (A-11) is a secondary cathodic electrolytic water produced by electrolyzing the primary cathodic electro- lytic water with the vitamin C added in the amount of 0.05% wt.

TABLE

|  | pH | dissolved oxygen concentration | oxidation reduction potential | dissolved chlorine concentration |
|---|---|---|---|---|
| (A-1) | 8.34 | 8.5 mg/l | 602 mv | 0.8 mg/l |
| (A-2) | 10.2 | 9.3 mg/l | −162 mv | 0 mg/l |
| (A-3) | 11.6 | 6.5 mg/l | −848 mv | 0 mg/l |
| (A-4) | 9.63 | 9.4 mg/l | −49 mv | 0 mg/l |
| (A-5) | 10.6 | 3.9 mg/l | −842 mv | 0 mg/l |
| (A-6) | 9.54 | 8.5 mg/l | −54 mv | 0 mg/l |
| (A-7) | 11.0 | 1.9 mg/l | −842 mv | 0 mg/l |
| (A-8) | 5.67 | 9.3 mg/l | 11 mv | 0 mg/l |
| (A-9) | 9.70 | 2.9 mg/l | −802 mv | 0 mg/l |
| (A-10) | 4.53 | 9.1 mg/l | 103 mv | 0 mg/l |
| (A-11) | 7.74 | 5.1 mg/l | −681 mv | 0 mg/l |

The foregoing test results show that in the secondary cathodic electrolytic water produced by electrolyzing the primary cathodic electrolytic water with the vitamin C added, the dissolved oxygen concentration becomes 1.9 5.1 mg/l. This value is remarkably lower than the dissolved oxygen concentration (9.3 mg/l) of the primary cathodic electrolytic water. The water of a low dissolved oxygen concentration is preferable for anaerobic bacteria in the digestive system, and suitable for drinking. Still, in the secondary cathodic electrolytic water produced by electro- lyzing the primary cathodic electrolytic water with the vitamin C added, the oxidation reduction potential becomes −681—−842 mv. This value is remarkably lower than the oxidation reduction potential (−162 mv) of the primary cathodic electrolytic water.

Thus, the secondary cathodic electrolytic water produced by electrolyzing the primary cathodic electrolytic water with a trace of vitamin C added has a remarkably low level of dissolved oxygen concentration and oxidation reduction potential compared with the primary cathodic electrolytic water, and is suitable for drinking and improving health. Furthermore, since the secondary cathodic electrolytic water produced by electrolyzing the primary cathodic electrolytic water with the vitamin C added does not contain dissolved chlorine (concentration 0 mg/l), it is suitable for drinking.

The additive vitamin C in amounts ranging from 0.005% to 0.05% shows effectiveness. If the additive quantity of the vitamin C is less than 0.005%, there is a possibility that the amount of chlorine in the electrolytic water cannot be suppressed completely. Furthermore, depending on the quantity of chlorine dissolved in the raw water, the vitamin C will be consumed in neutralizing the chlorine, thereby creating a possibility that the vitamin C cannot lower the dissolved oxygen concentration.

On the other hand, if the additive quantity of the vitamin C exceeds 0.05%, it will induce the secondary cathodic electrolytic water to become acidic and, moreover, it will increase the dissolved oxygen concentration, whereby the advantage of addition, when compared to a case without the vitamin C added and the merit of the vitamin C are lost.

The most appropriate weight percentage for the vitamin C to be added is between 0.01% and 0.02%. In this range, the dissolved oxygen concentration approximates to about 2.0 mg/l (1.9 mg/l in case of 0.01% vitamin C added). Since the dissolved oxygen concentration in the primary cathodic electrolytic water is 9.3 mg/l, the dissolved oxygen concen- tration is reduced to ¼ of that of the primary cathodic electrolytic water, which is very suitable for drinking. In the most appropriate range of 0.01%–0.02% for the vitamin C to be added, the oxidation reduction potential is −842 mv, which is sufficiently lower than the oxidation reduction potential of the primary cathodic electrolytic water, −162 mv. While the oxidation reduction potential of a water to show a high benefit for drinking has generally been consid- ered to be less than −300 mv, the oxidation reduction potential for the most appropriate range for the vitamin C to be added is less than −800 mv, which can provide a yet higher benefit from drinking.

The secondary cathodic electrolytic water produced by electrolyzing the primary cathodic electrolytic water, even without anything added, e.g. the vitamin C, is highly ben- eficial for drinking. However, the difference in the dissolved oxygen concentration becomes significant when the second- ary cathodic electrolytic water without anything added and the secondary cathodic electrolytic water with the vitamin C (0.01%) added are compared; namely, the dissolved oxygen concentration of the former is 6.5 mg/l and that of the latter is 1.9 mg/l.

Furthermore, the pH value of the secondary cathodic electrolytic water with the vitamin C (0.005–0.05%) added ranges from 10.6 to 7.74. On the other hand, the pH value of the secondary cathodic electrolytic water without any- thing added is 11.6. For a drinking water a pH not exceeding 10.5 is considered ideal, and from this point of view, the secondary cathodic electrolytic water with a trace of vitamin C added will show a higher benefit for drinking than the secondary cathodic electrolytic water without anything added.

In another series of tests vitamin C (ascorbic acid 100%) was added to the primary anodic electrolytic water produced by the electrolysis in a weight percentage of more than 0.005% based on the primary anodic electrolytic water, which was again electrolyzed in a conventional type elec- trolytic water producer.

In this series of tests the waters employed or produced are shown in the following table, wherein:

(B-1) is service water used as the raw water, (B-2) is a primary anodic electrolytic water produced by electrolyzing the service water, (B-3) is a secondary anodic electrolytic water produced by electrolyzing the primary anodic electrolytic water without anything added, (B-4) is the primary anodic electrolytic water with vita- min C added in the amount of 0.005% wt, (B-5) is a secondary anodic electrolytic water produced by electrolyzing the primary anodic electrolytic water with the vitamin C added in the amount of 0.005% wt, (B-6) is the primary anodic electrolytic water with vitamin C added in the amount of 0.01% wt, (B-7) is a secondary anodic electrolytic water produced by electrolyzing the primary anodic electrolytic water with the 0.01 wt % vitamin C added, (B-8) is the primary anodic electrolytic water with vitamin C added in the amount of 0.025 wt %, (B-9) is a secondary anodic electrolytic water produced by electrolyzing the primary anodic electrolytic water with 0.025% wt vitamin C added, (B-10) is the primary anodic electrolytic water with 0.05 wt. % vitamin C added, and (B-11) is a secondary anodic electrolytic water produced by electrolyzing the primary anodic electrolytic water with 0.05 wt % vitamin C added.

TABLE

| | pH | dissolved oxygen concentration | oxidation reduction potential | dissolved chlorine concentration |
|---|---|---|---|---|
| (B-1) | 6.56 | 8.1 mg/l | 519 mv | 0.8 mg/l |
| (B-2) | 2.45 | 15.3 mg/l | 454 mv | 5 mg/l |
| (B-3) | 1.87 | 19.4 mg/l | 907 mv | 6 mg/l |
| (B-4) | 2.32 | 14.9 mg/l | 322 mv | 0 mg/l |
| (B-5) | 1.74 | 25.4 mg/l | 330 mv | 0 mg/l |
| (B-6) | 2.31 | 14.8 mg/l | 297 mv | 0 mg/l |
| (B-7) | 1.71 | 21.0 mg/l | 327 mv | 0 mg/l |
| (B-8) | 2.23 | 14.8 mg/l | 292 mv | 0 mg/l |
| (B-9) | 1.70 | 22.4 mg/l | 296 mv | 0 mg/l |
| (B-10) | 2.11 | 14.1 mg/l | 294 mv | 0 mg/l |
| (B-11) | 1.61 | 23.4 mg/l | 293 mv | 0 mg/l |

The foregoing test results show that, in the secondary anodic electrolytic water produced by electrolyzing the primary anodic electrolytic water with the vitamin C (0.005%–0.05%) added, the dissolved oxygen concentration becomes 21.0–25.4 mg/l. This value is significantly higher than the dissolved oxygen concentration (16.3 mg/l) of the primary anodic electrolytic water or the dissolved oxygen concentration (19.4 mg/l) of the secondary anodic electrolytic water without anything added.

In the secondary anodic electrolytic water produced by electrolyzing the primary anodic electrolytic water with the vitamin C added, the dissolved oxygen concentration is so high as to kill or to suppress the activity of anaerobic bacteria only, and yet it is not harmful to aerobic bacteria. Therefore, the secondary anodic electrolytic water produced by electrolyzing the primary anodic electrolytic water with the vitamin C added can be applied in the field of biotechnology.

Furthermore, in the secondary anodic electrolytic water produced by electrolyzing the primary anodic electrolytic water with the vitamin C (0.005% 0.05%) added, the oxidation reduction potential becomes 293–330 mv. This value is significantly lower than the oxidation reduction potential (454 mv) of the primary anodic electrolytic water or the oxidation reduction potential (907 mv) of the secondary anodic electrolytic water produced by electrolyzing the primary anodic electrolytic water without anything added.

Thus, since the secondary anodic electrolytic water produced by electrolyzing the primary anodic electrolytic water with the vitamin C added has a low oxidation reduction potential, the water is noncorrosive. Therefore, the secondary anodic electrolytic water produced by electrolyzing the primary anodic electrolytic water with the vitamin C added can be used for cleaning metals which easily rust. Although, in cleaning metals using the conventional strong electrolytic acidic water (primary anodic electrolytic water), high carbon steel is subject to rust, which is disadvantageous, the secondary anodic electrolytic water produced by electrolyzing the primary anodic electrolytic water with the vitamin C added is noncorrosive, and the water is effective as a cleaning antiseptic solution for medical equipment such as a rotary bur for dental surgery and the like.

The vitamin C shows effectiveness when its amount is more than 0.005%. As the quantity of the vitamin C added decreases to less than 0.005%, the dissolved oxygen concentration decreases and the oxidation reduction potential increases so as to approximate the dissolved oxygen concentration and oxidation reduction potential of the primary anodic electrolytic water. In contrast, as the quantity of vitamin C added increases, the dissolved oxygen concentration gradually increases and the oxidation reduction potential gradually lowers. However, since the addition of the vitamin C shows a desired effectiveness in slight amounts, the quantitative upper limit for amount of added vitamin C will be omitted.

While the foregoing embodiment describes secondary electrolytic water as produced by electrolyzing a primary electrolytic water with the vitamin C added, in like manner, in a higher-order electrolysis, the "primary" may be read as "N-order", and the "secondary" as "(N+1)order".

As described above, according to the present invention, in the secondary cathodic electrolytic water produced by electrolyzing the primary cathodic electrolytic water with the vitamin C added, the dissolved oxygen concentration and the oxidation reduction potential can be significantly lowered as compared to the primary cathodic electrolytic water, and the water exhibits a high benefit as drinking water.

Further, since the secondary anodic electrolytic water produced by electrolyzing the primary anodic electrolytic water with the vitamin C added has so high a dissolved oxygen concentration that it can be used in applications requiring bactericidal or bacteriostatic activity to anaerobic bacteria only without harm to aerobic bacteria. In addition, the secondary anodic electrolytic water has a low oxidation reduction potential and is not corrosive and, therefore, it can be used for cleaning metals which easily rust.

What is claimed is:

1. A method for treating water comprising:
   electrolyzing the water to form positively charged water and negatively charged water;
   separating said positively charged water from said negatively charged water;
   adding vitamin C to the separated positively charged water in the amount of 0.005–0.5 wt. % of the water; and
   electrolyzing the positively charged water containing added vitamin C.

2. A method for treating water according to claim 1 wherein said amount of vitamin C added is 0.01–0.02 wt. % of the water.

3. A method for treating water comprising:
   electrolyzing the water to form positively charged water and negatively charged water;
   separating said negatively charged water from said positively charged water;
   adding to the separated negatively charged water more than 0.005 wt. % of vitamin C, based on the weight of the negatively charged water; and
   electrolyzing the negatively charged water containing the added vitamin C.

* * * * *

UNITED STATES PATENT AND TRADEMARK OFFICE
CERTIFICATE OF CORRECTION

PATENT NO. : 5,736,027
DATED : April 7, 1998
INVENTOR(S) : Tadamasa NAKAMURA

It is certified that error appears in the above-indentified patent and that said Letters Patent is hereby corrected as shown below:

Col. 2, line 29, "0.005 0.05%" should read "0.005-0.05%".

Col. 3, line 40, "1.9 5.1" should read --1.9-5.1--.

Col. 5, line 53, "(0.005% 0.05%)" should read --(0.005%-0.05%)--.

Signed and Sealed this

Thirteenth Day of April, 1999

Attest:

Q. TODD DICKINSON

*Attesting Officer*  *Acting Commissioner of Patents and Trademarks*